(12) United States Patent
Oba

(10) Patent No.: US 9,915,555 B2
(45) Date of Patent: Mar. 13, 2018

(54) ULTRASONIC SENSOR

(71) Applicant: Mitsubishi Electric Corporation, Chiyoda-ku, Tokyo (JP)

(72) Inventor: Tetsuya Oba, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 216 days.

(21) Appl. No.: 14/609,627

(22) Filed: Jan. 30, 2015

(65) Prior Publication Data
US 2016/0116330 A1    Apr. 28, 2016

(30) Foreign Application Priority Data
Oct. 23, 2014    (JP) .................. 2014-215931

(51) Int. Cl.
| | | |
|---|---|---|
| *G01D 11/24* | (2006.01) | |
| *G01S 15/93* | (2006.01) | |
| *G01S 7/521* | (2006.01) | |
| *G01N 29/04* | (2006.01) | |
| *G01N 29/14* | (2006.01) | |
| *G01H 1/12* | (2006.01) | |

(52) U.S. Cl.
CPC ............ *G01D 11/245* (2013.01); *G01S 7/521* (2013.01); *G01S 15/931* (2013.01)

(58) Field of Classification Search
CPC ........ G01S 7/521; G01N 29/04; G01N 29/14; G01N 29/222; G01N 29/223; G01N 29/225; G01H 1/12; G01D 11/245
USPC ............... 73/618, 622, 632, 633, 644, 649; 310/338
See application file for complete search history.

(56) References Cited

U.S. PATENT DOCUMENTS

2006/0241474 A1* 10/2006 Kawashima ............ G01S 7/521
  600/459
2006/0284515 A1    12/2006 Nakajima
  (Continued)

FOREIGN PATENT DOCUMENTS

JP    1-232629 A    9/1989
JP    2002081542 A    3/2002
(Continued)

OTHER PUBLICATIONS

Communication from the Japanese Patent Office dated Aug. 4, 2015 in counterpart application No. 2014-215931.

*Primary Examiner* — Manish S Shah
*Assistant Examiner* — Suman K Nath
(74) *Attorney, Agent, or Firm* — Sughrue Mion, PLLC; Richard C. Turner

(57) ABSTRACT

An ultrasonic sensor, which can prevent a breakdown caused by the infiltration of water from the outside occurring due to the jet of high-pressure wash water or the like without the deterioration of the sensitivity of an ultrasonic transducer within the range of the fixing-clamping caused by an elastic member, is obtained. The ultrasonic sensor includes a cylindrical sensor case, an ultrasonic transducer that is disposed close to an opening face in the sensor case and includes a vibration surface, and an elastic member that is provided between the ultrasonic transducer and the sensor case and covers a side surface and a bottom of the ultrasonic transducer. An exposed surface end of the elastic member close to the opening face is formed to be thinner than a portion of the elastic member that covers the side surface of the ultrasonic transducer.

14 Claims, 25 Drawing Sheets

(56) References Cited

U.S. PATENT DOCUMENTS

| | | | |
|---|---|---|---|
| 2007/0230273 A1* | 10/2007 | Nakajima | G01S 7/521 367/140 |
| 2009/0314575 A1 | 12/2009 | Reiche | |
| 2011/0088479 A1* | 4/2011 | Urase | G01S 7/521 73/649 |
| 2012/0167689 A1* | 7/2012 | Urase | G01S 7/521 73/627 |
| 2012/0240680 A1 | 9/2012 | Urase et al. | |

FOREIGN PATENT DOCUMENTS

| | | |
|---|---|---|
| JP | 3628480 B2 | 3/2005 |
| JP | 2006345312 A | 12/2006 |
| JP | 2010501869 A | 1/2010 |
| JP | 2012198110 A | 10/2012 |

\* cited by examiner

ULTRASONIC SENSOR

BACKGROUND OF THE INVENTION

Field of the Invention

The present invention relates to an ultrasonic sensor including an ultrasonic transducer, and more particularly, to an ultrasonic sensor that detects the position of an object to be measured using a propagation phenomenon of ultrasonic waves.

Description of the Related Art

In the past, an ultrasonic sensor has been mounted on, for example, an automobile and has been used as a vehicle-periphery monitoring sensor that measures a distance between the automobile and an obstacle. Further, the ultrasonic sensor is applied to a preventive safety system that warns a driver when the distance between the automobile and an obstacle is close to a preset distance, automatically controls a brake when there is a collision hazard, and the like.

Here, the structure of the ultrasonic sensor will be described. The ultrasonic sensor has a structure where an ultrasonic transducer is assembled in a sensor case. The ultrasonic transducer includes a circular vibration surface, and includes a piezoelectric element. When a voltage is applied to the piezoelectric element, the piezoelectric element is vibrated by a piezoelectric effect and sends ultrasonic wave signals. When the piezoelectric element receives incoming ultrasonic wave signals, the piezoelectric element generates a voltage by an inverse piezoelectric effect. Furthermore, the ultrasonic sensor includes a circuit that is provided in a sensor case, drives the ultrasonic transducer, and processes a received signal voltage (for example, Patent Document 1).

[Patent Document 1] Japanese Patent No. 3628480
[Patent Document 2] JP-A-01-232629

However, for the efficient driving of the ultrasonic transducer of the ultrasonic sensor in the related art disclosed in Patent Document 1, high pressure cannot be applied to the ultrasonic transducer when the ultrasonic transducer is fixed. Accordingly, in the ultrasonic sensor in the related art, a gap is formed between the ultrasonic transducer and an elastic member holding the ultrasonic transducer and a gap is formed between the elastic member and the sensor case. For this reason, it is not possible to completely block the infiltration of water into the sensor case from the outside. Therefore, the influence of water, which infiltrates from the outside, easily exceeds the limit of a seal function of the ultrasonic sensor, and the infiltrating water reaches a position directly below the bottom of the ultrasonic transducer (the back side of the ultrasonic transducer). In addition, the influence of the water, which infiltrates from the outside and loses the destination thereof in the sensor case, generates a force that extrudes the ultrasonic transducer (or the elastic member and the like in addition to the ultrasonic transducer) to the outside of the sensor case.

Accordingly, when the mechanical strength of a line, such as a lead wire or a metal pin, or a connector for electrically connecting the ultrasonic transducer to a circuit board gradually reaches a limit, the line, such as a lead wire or a metal pin, or the connector is fractured. For this reason, the electrical connection between the ultrasonic transducer and the circuit board is damaged. As a result, the ultrasonic sensor cannot operate and breaks down. Even if the line, such as a lead wire or a metal pin, or the connector is not fractured, an excessive-length portion of the line embedded in a filler filling the sensor case is extruded and a water-infiltration passage is formed at a boundary between the filler and the line, such as a lead wire or a metal pin. For this reason, the infiltration of water to the circuit board included in the sensor case is allowed and causes a short circuit. As a result, the ultrasonic sensor breaks down.

Meanwhile, as a countermeasure against the above-mentioned breakdown, a structure in which a convex portion is provided on the outer surface of the ultrasonic transducer and is fitted to a holder in order to regulate the infiltration of water into the ultrasonic sensor or an ultrasonic switch having a structure that regulates the movement of the ultrasonic transducer is proposed (for example, see Patent Document 2).

However, since the shape of a general ultrasonic transducer is a substantially columnar shape, it is not possible to easily form a convex portion or a concave portion. For this reason, it is difficult to easily achieve the above-mentioned seal structure or the structure that regulates the movement of the ultrasonic transducer. Accordingly, when water, which is jetted with high pressure, directly hits the surface of the ultrasonic sensor, a risk that a breakdown is caused by the movement of the ultrasonic transducer is increased. In particular, when the ultrasonic sensor is mounted on an automobile, a scene in which an automobile is washed with high-pressure wash water is supposed. Accordingly, a risk that high-pressure wash water directly hits the ultrasonic sensor exposed to the surface of the automobile and a breakdown is caused by the movement of the ultrasonic transducer is high.

SUMMARY OF THE INVENTION

The invention has been made to solve the above-mentioned problems, and an object of the invention is to provide an ultrasonic sensor that can prevent a breakdown caused by the infiltration of water from the outside occurring due to the jet of high-pressure wash water or the like without the deterioration of the sensitivity of an ultrasonic transducer within the range of the fixing-clamping caused by an elastic member.

An ultrasonic sensor according to an aspect of the invention includes a cylindrical sensor case, an ultrasonic transducer that is disposed close to an opening face in the sensor case and includes a vibration surface, and an elastic member that is provided between the ultrasonic transducer and the sensor case and covers a side surface and a bottom of the ultrasonic transducer. An exposed surface end of the elastic member close to the opening face is formed to be thinner than a portion of the elastic member that covers the side surface of the ultrasonic transducer.

According to the ultrasonic sensor of the aspect of the invention, since the exposed surface end of the elastic member close to the opening face is formed to be thinner than a portion of the elastic member that covers the side surface of the ultrasonic transducer, the portion of the elastic member, which is formed to be thin, acts as a valve. Accordingly, it is possible to obtain an ultrasonic sensor that can prevent a breakdown caused by the infiltration of water from the outside occurring due to the jet of high-pressure wash water or the like without the deterioration of the sensitivity of an ultrasonic transducer within the range of the fixing-clamping caused by an elastic member.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

A first embodiment of the invention will be described below with reference to the drawings.

Figure 1:
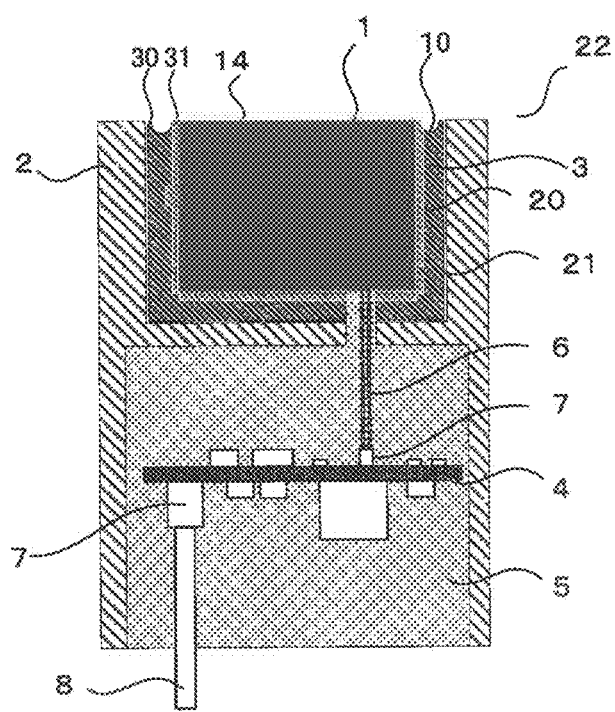
FIG. 1 is a cross-sectional view of an ultrasonic sensor according to a first embodiment of the invention.

FIG. 1 is a cross-sectional view of an ultrasonic sensor according to a first embodiment. As shown in FIG. 1, an ultrasonic sensor 22 includes an ultrasonic transducer 1 and a circuit board 4 that are provided in a sensor case 2, and the ultrasonic transducer 1 includes a vibration surface 14. The ultrasonic transducer 1 is disposed close to an opening face in the sensor case 2. Further, a cylindrical elastic member 3 is provided between the ultrasonic transducer 1 and the bottomed cylindrical sensor case 2 that receives the ultrasonic transducer 1 so that the transmission of vibration to the sensor case 2 from the ultrasonic transducer 1 is prevented and the ultrasonic transducer 1 can be efficiently vibrated. The elastic member 3 is formed so as to cover the side surface and the bottom of the ultrasonic transducer 1. The ultrasonic transducer 1 is held and fixed by the elastic member 3 and is received in the sensor case 2. Surface pressure of a minimum level, which is necessary to mechanically hold the ultrasonic transducer 1 so that the sensitivity of the ultrasonic transducer 1 does not deteriorate, is required as pressure that is generated by the elastic member 3 to clamp the ultrasonic transducer 1. Here, a vibration-proof material, such as silicone rubber, is generally used as the material of the elastic member 3. Furthermore, a concave portion 10 is formed at an exposed surface end of the elastic member 3 close to the opening face, that is, at an end portion of the elastic member 3 that is present on the same side as the vibration surface 14 of the ultrasonic transducer 1. Since the concave portion 10 is formed at the elastic member 3, the exposed surface end of the elastic member 3 close to the opening face is formed to be thinner than a portion of the elastic member 3 that covers the side surface of the ultrasonic transducer 1.

Moreover, the electrical connection between the ultrasonic transducer 1 and the circuit board 4, which includes a circuit driving the ultrasonic transducer 1 and processing a received signal voltage, is achieved by electrical connecting means, such as a lead wire 6 and a connector 7. The electrical connection between the ultrasonic transducer 1 and the circuit board 4 is not limited to the lead wire 6, and may be achieved by, for example, a metal pin or the like. That is, the electrical connection between the ultrasonic transducer 1 and the circuit board 4 is achieved by a line, such as the lead wire 6 or a metal pin.

Further, a filler 5, such as a moisture-proof silicone resin, is injected to an important position in the sensor case 2 in order to protect the circuit board 4, which is included in the sensor case 2, from an external factor such as infiltration of rainwater or the like.

Furthermore, the electrical connection between a control unit (not shown), which warns a driver on the basis of a detection result of the ultrasonic sensor 22 or performs the determination of a brake control based on the detection result of the ultrasonic sensor 22 or an automatic brake instruction, and the ultrasonic sensor 22, is achieved by a cable 8 that is connected to the circuit board 4 through the connector 7.

Figure 2:
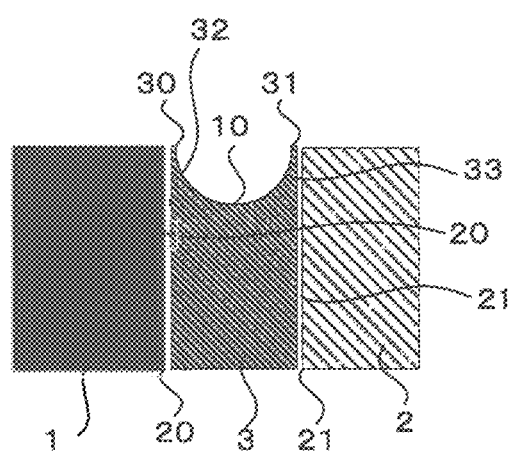
FIG. 2 is an enlarged cross-sectional view of an opening face of the ultrasonic sensor according to the first embodiment of the invention.

FIG. 2 is an enlarged cross-sectional view of the opening face of the ultrasonic sensor according to the first embodiment of the invention shown in FIG. 1. As shown in FIG. 2, the concave portion 10 is formed at the exposed surface end of the elastic member 3 close to the opening face, that is, at the end portion of the elastic member 3 that is present on the same side as the vibration surface 14 of the ultrasonic transducer 1. Since the concave portion 10 is formed at the elastic member 3, the exposed surface end of the elastic member 3 close to the opening face is formed to be thinner than the portion of the elastic member 3 that covers the side surface of the ultrasonic transducer 1. Thin portions 30 and 31, which are formed at the exposed surface end of the elastic member 3, include inclined surfaces 32 and 33 that are inclined toward the middle of the elastic member 3 in a thickness direction, respectively. The inclined surfaces 32 and 33 have a curved cross-sectional shape, and include curved surfaces. That is, the thin portions 30 and 31 have a cross-sectional shape that gradually becomes thin toward the exposed surface end of the elastic member 3. In the ultrasonic sensor 22 according to the first embodiment, an inner peripheral portion, which faces the ultrasonic transducer 1 with a gap 20 interposed therebetween, and an outer peripheral portion, which faces the sensor case 2 with a gap 21 interposed therebetween, of the exposed surface end of the elastic member 3 close to the opening face are formed to be thin.

Figure 3:
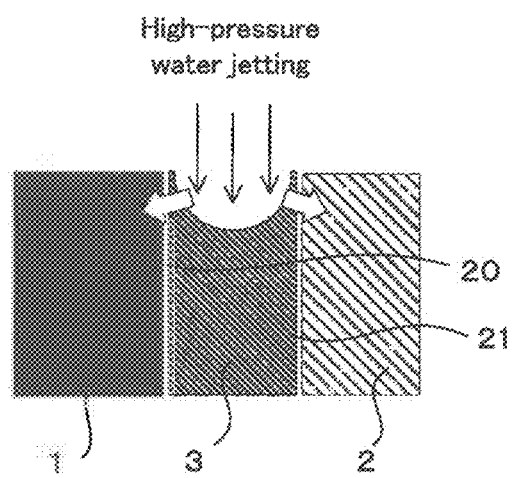
FIG. 3 is an enlarged cross-sectional view showing a state in which high-pressure water is jetted in FIG. 2.

FIG. 3 is an enlarged cross-sectional view showing a state in which high-pressure water is jetted in FIG. 2. In FIG. 3, outline arrows indicate decomposed pressure vectors of jetted high-pressure wash water. As shown in FIG. 3, the thin portions 30 and 31, which are formed by the concave portion 10 formed at the exposed surface end of the elastic member 3, include the inclined surfaces 32 and 33 that are inclined from the gaps 20 and 21 toward the middle of the elastic member 3 in the thickness direction. Accordingly, pressure, which is applied to the elastic member 3 by the jet of high-pressure wash water, is decomposed into pressure vectors that are directed to the gaps 20 and 21 by the inclined surfaces 32 and 33.

Therefore, the thin portions 30 and 31 are deformed and collapsed by the pressure of the high-pressure wash water, which is jetted to the ultrasonic sensor 22, so as to close water-infiltration passages that are formed of the gaps 20 and 21. That is, the thin portions 30 and 31, which are formed to be thin, act as valves that are to close the water-infiltration passages formed of the gap 20 between the ultrasonic transducer 1 and the elastic member 3 and the gap 21 between the elastic member 3 and the sensor case 2. Each of the thin portions 30 and 31 forms an annular valve. In addition, the thin portions 30 and 31 apply pressure to the ultrasonic transducer 1 and the sensor case 2, respectively. Since the infiltration of the high-pressure wash water through the water-infiltration passages is inhibited by a sealing effect and a clamping effect for the water-infiltration passages that are generated by the collapse of the above-mentioned thin portions 30 and 31, the ultrasonic sensor 22 can prevent damage that is caused by the infiltration of water reaching a position directly below the bottom of the ultrasonic transducer 1 (the back side of the ultrasonic transducer 1). Further, a sealing effect and a clamping effect for the water-infiltration passages, which are generated by the thin portions 30 and 31, can be more effective as the jetted pressure of the high-pressure wash water is higher.

Furthermore, a case in which the ultrasonic transducer 1 is subjected to clamping caused by the thin portions 30 and 31 as described above is a case in which high-pressure wash water directly hits the ultrasonic sensor 22. Accordingly, when the ultrasonic sensor 22 should be operated, such as when a vehicle is traveling or when a vehicle is being parked, the thin portions 30 and 31 act as valves. For this reason, the malfunction of a system, which is caused by the deterioration of the sensitivity of the sensor occurring due to clamping caused by the thin portions 30 and 31, does not occur.

As described above, in the ultrasonic sensor 22 according to the first embodiment of the invention, the exposed surface end of the elastic member 3 close to the opening face is formed to be thinner than the portion of the elastic member 3 that covers the side surface of the ultrasonic transducer 1. Accordingly, it is possible to obtain an ultrasonic sensor that can prevent a breakdown caused by the jet of high-pressure wash water without the deterioration of the sensitivity of the ultrasonic transducer 1 within the range of the clamping caused by the elastic member 3.

Figure 4:
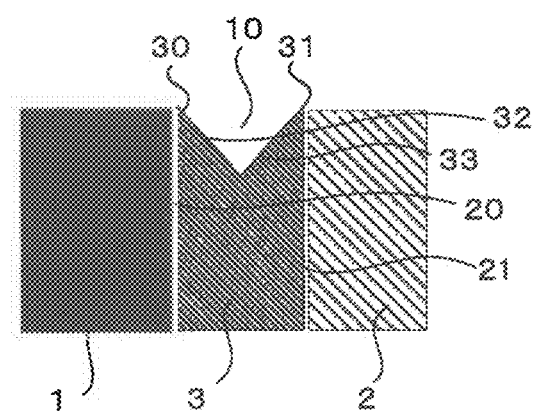
FIG. 4 is an enlarged cross-sectional view showing a modification of the ultrasonic sensor according to the first embodiment of the invention.

FIG. 4 is an enlarged cross-sectional view showing a modification of the ultrasonic sensor according to the first embodiment of the invention. In FIG. 4, thin portions 30 and 31 are formed on both sides of the elastic member 3 by a concave portion 10 formed at the elastic member 3. In the ultrasonic sensor 22 shown in FIG. 2, the thin portions 30 and 31 have a curved cross-sectional shape and include inclined surfaces 32 and 33 including curved surfaces, respectively. However, in the modification shown in FIG. 4, the thin portions 30 and 31 have a linear cross-sectional shape and may be flat surfaces including inclined surfaces 32 and 33. In FIG. 4, the concave portion 10 has a V-shaped cross-section.

Figure 5:
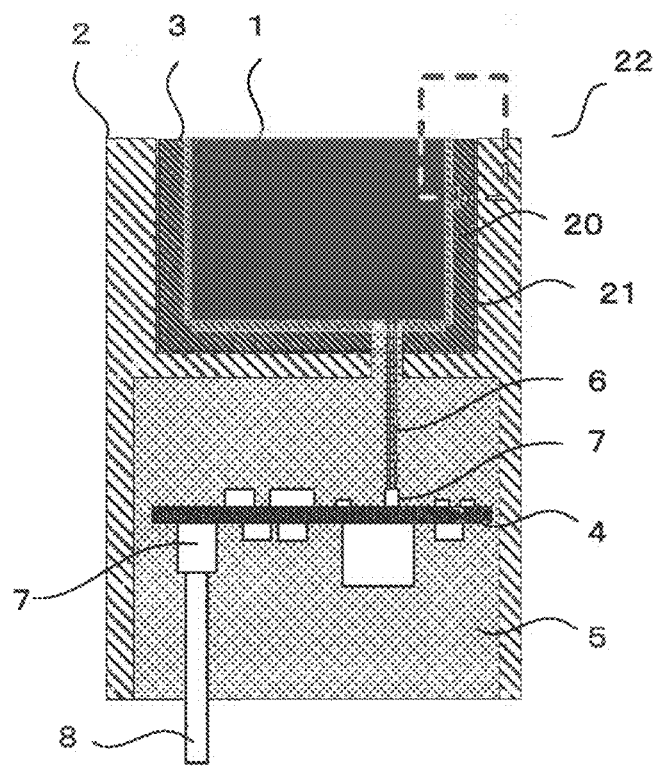
FIG. 5 is a cross-sectional view of an ultrasonic sensor according to a comparative example.
Figure 6:
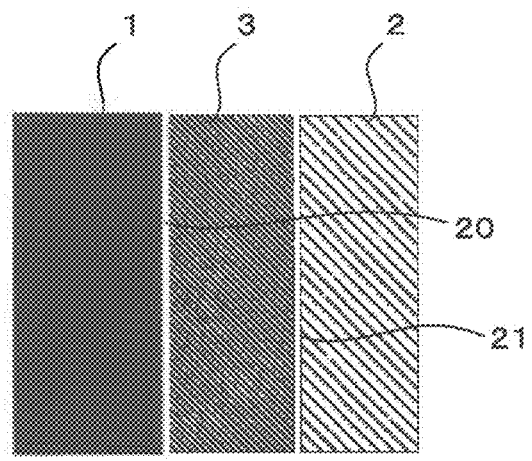
FIG. 6 is an enlarged cross-sectional view of an opening face of the ultrasonic sensor according to the comparative example.

FIG. 5 is a cross-sectional view of an ultrasonic sensor according to a comparative example. FIG. 6 is an enlarged cross-sectional view of an opening face of the ultrasonic sensor according to the comparative example, and is an enlarged cross-sectional view of a portion surrounded by a broken-line frame of FIG. 5, that is, a portion of an elastic member 3 close to an opening face.

In the ultrasonic sensor 22 according to the comparative example, a gap 20 is formed between an ultrasonic transducer 1 and the elastic member 3 holding the ultrasonic transducer 1 and a gap 21 is formed between the elastic member 3 and a sensor case 2 as shown in FIGS. 5 and 6. For this reason, the infiltration of water into the sensor case 2 from the outside cannot be completely prevented. Accordingly, water, which has infiltrated from the outside, reaches a position directly below the bottom of the ultrasonic transducer 1, and a force extruding the ultrasonic transducer 1 to the outside of the sensor case 2 is generated by water that loses the destination thereof in the sensor case 2. Therefore, when the mechanical strength of the lead wire 6 or the connector 7 electrically connecting the ultrasonic transducer 1 to the circuit board 4 reaches a limit, the lead wire 6 or the connector 7 is fractured. For this reason, the electrical connection between the ultrasonic transducer 1 and the circuit board 4 is damaged. As a result, there is a problem in that the ultrasonic sensor 22 cannot operate and breaks down. In addition, water infiltrates to the circuit board 4 included in the sensor case 2 and the circuit board 4 causes a short circuit. As a result, there is also a problem in that the ultrasonic sensor 22 breaks down.

Meanwhile, in the ultrasonic sensor 22 according to the first embodiment of the invention, as shown in FIGS. 1 to 3, the concave portion 10 is formed at the exposed surface end of the elastic member 3 close to the opening face, that is, at the end portion of the elastic member 3 that is present on the same side as the vibration surface 14 of the ultrasonic transducer 1. Since the concave portion 10 is formed at the elastic member 3, the exposed surface end of the elastic member 3 close to the opening face is formed to be thinner than the portion of the elastic member 3 that covers the side surface of the ultrasonic transducer 1. The thin portions 30 and 31, which are formed at the exposed surface end of the elastic member 3, include inclined surfaces 32 and 33 that are inclined toward the middle of the elastic member 3 in a thickness direction, respectively.

Accordingly, pressure, which is applied to the elastic member 3 by high-pressure wash water when the high-pressure wash water directly hits the ultrasonic sensor 22, is decomposed into pressure vectors that are directed to the gaps 20 and 21, respectively. Therefore, the thin portions 30 and 31 are deformed and collapsed so as to close water-infiltration passages that are formed of the gaps 20 and 21. That is, the thin portions 30 and 31, which are formed to be thin, act as valves that are to close the water-infiltration passages formed of the gap 20 between the ultrasonic transducer 1 and the elastic member 3 and the gap 21 between the elastic member 3 and the sensor case 2.

Since the infiltration of the high-pressure wash water through the water-infiltration passages is inhibited by a sealing effect and a clamping effect for the water-infiltration passages that are generated by the collapse of the above-mentioned thin portions 30 and 31 in this way, the ultrasonic sensor 22 can prevent damage that is caused by the infiltration of water reaching a position directly below the bottom of the ultrasonic transducer 1.

Second Embodiment

Figure 7:
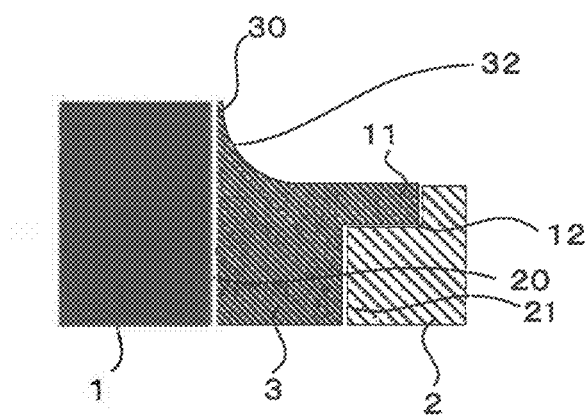
FIG. 7 is an enlarged cross-sectional view of an opening face of an ultrasonic sensor according to a second embodiment of the invention.
Figure 8:
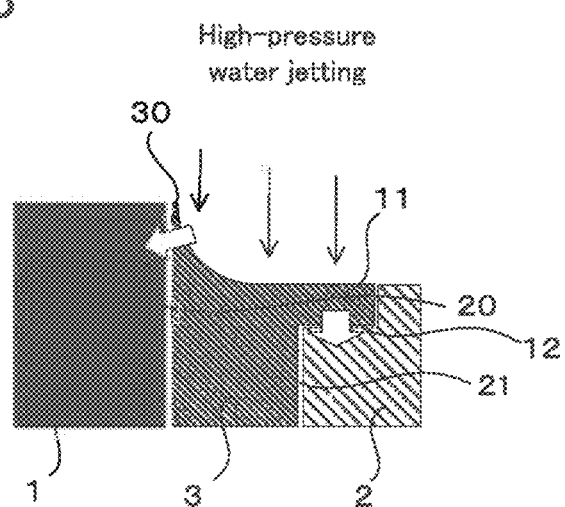
FIG. 8 is an enlarged cross-sectional view showing a state in which high-pressure water is jetted in FIG. 7.

FIG. 7 is an enlarged cross-sectional view of an opening face of an ultrasonic sensor according to a second embodiment of the invention. FIG. 8 is an enlarged cross-sectional view showing a state in which high-pressure water is jetted in FIG. 7. In the second embodiment, the same reference numerals as the reference numerals of the first embodiment denote the same components as the components of the first embodiment. Accordingly, the description of the same components will be omitted. As shown in FIGS. 7 and 8, an exposed surface end of an elastic member 3 close to an opening face, that is, at an end portion of the elastic member 3, which is present on the same side as a vibration surface 14 of an ultrasonic transducer 1, is formed to be thinner than a portion of the elastic member 3 that covers the side surface of the ultrasonic transducer 1. A thin portion 30, which is formed at the exposed surface end of the elastic member 3, includes an inclined surface 32 that is inclined toward the middle of the elastic member 3 in a thickness direction. The inclined surface 32 has a curved cross-sectional shape and includes a curved surface. An inner peripheral portion, which faces the ultrasonic transducer 1 with a gap 20 interposed therebetween, of the exposed surface end of the elastic member 3, which is close to the opening face, of the second embodiment is formed to be thin.

Furthermore, in the second embodiment, an annular protrusion 11, which protrudes to the outside (toward the sensor case 2), is formed on an outer peripheral portion of the elastic member 3 that faces the sensor case 2. Further, an annular stepped portion 12 to which the annular protrusion 11 is fitted is formed at a corresponding inner peripheral portion of the sensor case 2 (a portion of the sensor case 2 close to the elastic member 3). Accordingly, a gap 21 formed between the elastic member 3 and the sensor case 2 is bent. A water-infiltration passage, which is formed of the gap 21 formed when high-pressure water is jetted, forms a passage bent as shown in FIG. 7.

FIG. 8 is an enlarged cross-sectional view showing a state in which high-pressure water is jetted in FIG. 7. As shown in FIG. 8, the thin portion 30, which is formed at the exposed surface end of the elastic member 3, includes the inclined surface 32 that is inclined from the gap 20 toward the middle of the elastic member 3 in a thickness direction. Accordingly, pressure, which is applied to the elastic member 3 by high-pressure wash water, is decomposed into a pressure vector, which is directed to the gap 20, by the inclined surface 32. Therefore, the thin portion 30 is deformed and collapsed so as to close the water-infiltration passage that is formed of the gap 20. In addition, the thin portion 30 applies pressure to the ultrasonic transducer 1.

Meanwhile, the annular protrusion 11, which protrudes to the outside of the elastic member 3 (toward the sensor case 2), is formed on the outer peripheral portion of the elastic member 3. Further, since the gap 21, which is formed when the stepped portion 12 formed at the inner peripheral portion of the sensor case 2 (the portion of the sensor case 2 close to the elastic member 3) corresponding to the protrusion 11 is fitted, forms the bent passage as described above, the influence of the infiltration of water, which is caused by the jet of the high-pressure water, is reduced by a bypass water-infiltration passage. As a result, the ultrasonic sensor 22 can prevent the infiltration of water that reaches a position directly below the bottom of the ultrasonic transducer 1 (the back side of the ultrasonic transducer 1).

Furthermore, when high-pressure wash water directly hits the annular protrusion 11 formed on the elastic member 3 as shown in FIG. 8, pressure applied to the stepped portion 12 formed at the sensor case 2 is generated. Accordingly, the infiltration of the high-pressure wash water through the water-infiltration passage is inhibited by a sealing effect and a clamping effect for the water-infiltration passage that are generated by the pressure. Therefore, the ultrasonic sensor 22 can prevent the infiltration of water that reaches a position directly below the bottom of the ultrasonic transducer 1 (the back side of the ultrasonic transducer 1). Moreover, a sealing effect and a clamping effect for the water-infiltration passage, which are generated by the annular protrusion 11 of the elastic member 3 protruding to the outside (toward the sensor case 2), can be more effective as the jetted pressure of the high-pressure wash water is higher.

Further, a case in which the ultrasonic transducer 1 is subjected to clamping caused by the thin portion 30 as described above is a case in which high-pressure wash water directly hits the ultrasonic sensor 22. Accordingly, when the ultrasonic sensor 22 should be operated, such as when a vehicle is traveling or when a vehicle is being parked, the malfunction of a system, which is caused by the deterioration of the sensitivity of the sensor occurring due to clamping caused by the thin portion 30, does not occur.

As described above, the ultrasonic sensor according to the second embodiment of the invention includes the thin portion 30, the elastic member 3 that includes the annular protrusion 11 protruding to the outside (toward the sensor case 2), and the sensor case 2 that includes the stepped portion 12 which is formed at the corresponding inner peripheral portion of the sensor case 2 (the portion of the sensor case 2 close to the elastic member 3) and to which the protrusion 11 is fitted. Accordingly, it is possible to obtain the ultrasonic sensor 22 that can prevent a breakdown caused by the jet of high-pressure wash water without the deterioration of the sensitivity of the ultrasonic transducer 1 within the range of the clamping caused by the elastic member 3.

Figure 9:
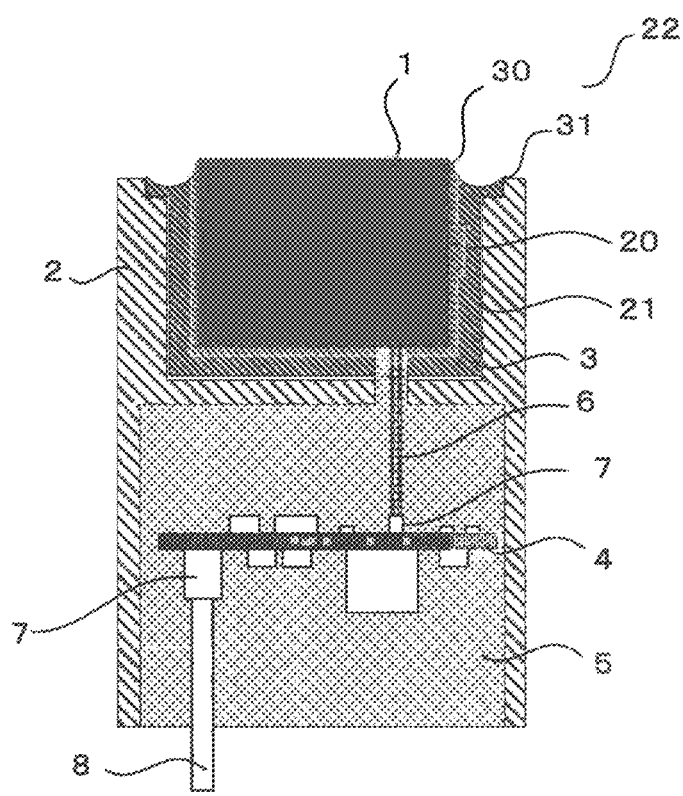
FIG. 9 is a cross-sectional view showing a modification of the ultrasonic sensor according to the second embodiment of the invention.
Figure 10:
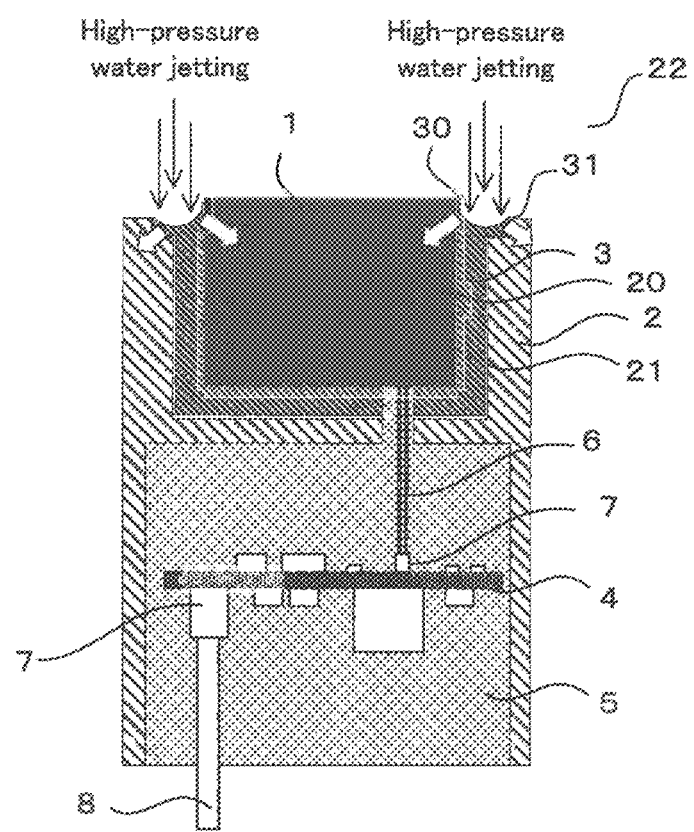
FIG. 10 is a cross-sectional view showing a state in which high-pressure water is jetted in FIG. 9.
Figure 11:
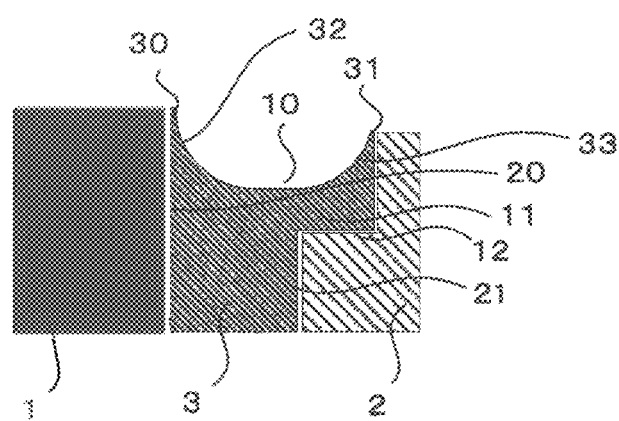
FIG. 11 is an enlarged cross-sectional view of an opening face of the ultrasonic sensor of FIG. 9.
Figure 12:
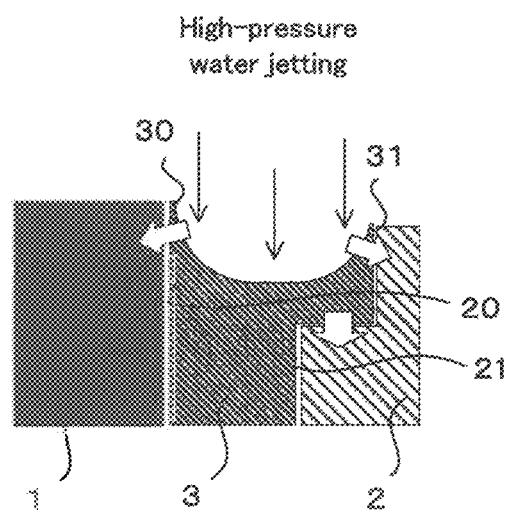
FIG. 12 is an enlarged cross-sectional view showing a state in which high-pressure water is jetted in FIG. 11, and is an enlarged cross-sectional view of the opening face of the ultrasonic sensor of FIG. 10.

FIG. 9 is a cross-sectional view showing a modification of the ultrasonic sensor according to the second embodiment of the invention. FIG. 10 is a cross-sectional view showing a state in which high-pressure water is jetted in FIG. 9. FIG. 11 is an enlarged cross-sectional view of an opening face of the ultrasonic sensor of FIG. 9. FIG. 12 is an enlarged cross-sectional view showing a state in which high-pressure water is jetted in FIG. 11, and is an enlarged cross-sectional view of the opening face of the ultrasonic sensor of FIG. 10.

In the modification of the ultrasonic sensor according to the second embodiment, as shown in FIGS. 9 to 12, a thin portion 31 is formed at a portion of the protrusion 11 of the elastic member 3, which faces the sensor case 2, in addition to the structure of the second embodiment to obtain the same effects as the effects of the first embodiment. That is, in the ultrasonic sensor 22 according to the invention, as shown in FIG. 9, annular thin portions 30 and 31, which act as valves respectively for closing water-infiltration passages formed of a gap 20 between the ultrasonic transducer 1 and the elastic member 3 and a gap 21 between the elastic member 3 and the sensor case 2, which can form water-infiltration passages, are formed at the exposed surface end of the elastic member 3 close to the opening face.

Accordingly, when high-pressure wash water directly hits the thin portions 30 and 31 formed at the exposed surface end of the elastic member 3 close to the opening face, the thin portions 30 and 31 are deformed and collapsed so as to close the water-infiltration passages as shown in FIG. 10. For this reason, the infiltration of water, which reaches a position directly below the bottom of the ultrasonic transducer 1 (the back side of the ultrasonic transducer 1), does not occur. Further, a case in which the ultrasonic transducer 1 is subjected to clamping caused by the thin portions 30 and 31 is a case in which high-pressure wash water directly hits the ultrasonic sensor 22. Accordingly, when the ultrasonic sensor 22 should be operated, such as when a vehicle is traveling or when a vehicle is being parked, the malfunction of a system, which is caused by the deterioration of the sensitivity of the sensor occurring due to clamping caused by the thin portions 30 and 31, does not occur.

Meanwhile, in the ultrasonic sensor 22 according to the second embodiment, an opening face of the sensor case 2 and an outer peripheral portion of the elastic member 3 facing the sensor case 2 recede from the vibration surface 14 of the ultrasonic transducer 1. That is, since the vibration surface 14 of the ultrasonic sensor 22 according to the second embodiment protrudes from the opening face of the sensor case 2 and an outer peripheral surface of the elastic member 3 facing the sensor case 2, the vibration surface 14 of the ultrasonic transducer 1, the outer peripheral portion of the elastic member 3, and the opening face of the sensor case 2 are not flush with one another.

Since the outer peripheral portion of the ultrasonic sensor 22 recedes, high-pressure water to be jetted escapes to the outside when the high-pressure water is jetted. Accordingly, the concentration of water on the gap can be further prevented.

Third Embodiment

Figure 13:
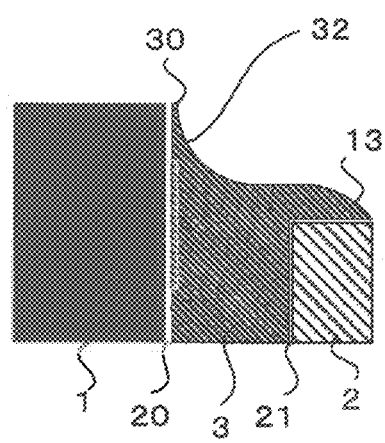
FIG. 13 is an enlarged cross-sectional view of an opening face of an ultrasonic sensor according to a third embodiment of the invention.
Figure 14:
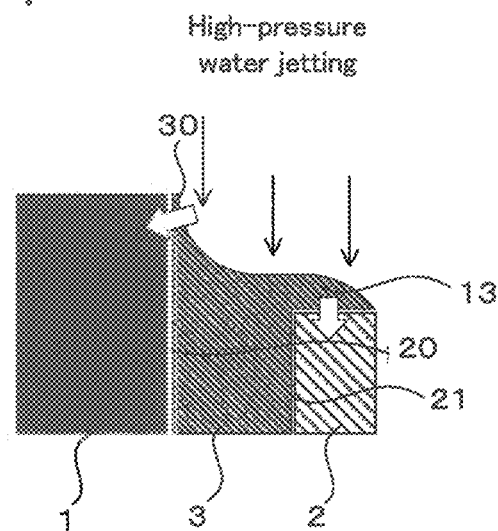
FIG. 14 is an enlarged cross-sectional view showing a state in which high-pressure water is jetted in FIG. 13.

FIG. 13 is an enlarged cross-sectional view of an ultrasonic sensor according to a third embodiment of the invention. FIG. 14 is an enlarged cross-sectional view showing a state in which high-pressure water is jetted in FIG. 13. In the third embodiment, the same reference numerals as the reference numerals of the first and second embodiments denote the same components as the components of the first and second embodiments. Accordingly, the description of the same components will be omitted.

As shown in FIGS. 13 and 14, in an ultrasonic sensor 22 according to the third embodiment of the invention, an annular protrusion 13 is formed on the outer peripheral portion of an elastic member 3, which is close to the opening face, so as to cover the front end of an adjacent sensor case 2 close to the opening face. Accordingly, when high-pressure water is jetted, a water-infiltration passage formed of a gap 21 formed between the elastic member 3 and the sensor case 2 forms a passage bent as shown in FIGS. 13 and 14 and allows an opening of the water-infiltration passage, which is formed of the gap 21, to be directed not to the front but to the side of the ultrasonic sensor to which high-pressure water is jetted. Therefore, the direct infiltration of high-pressure water into the water-infiltration passage can be prevented.

Figure 15:
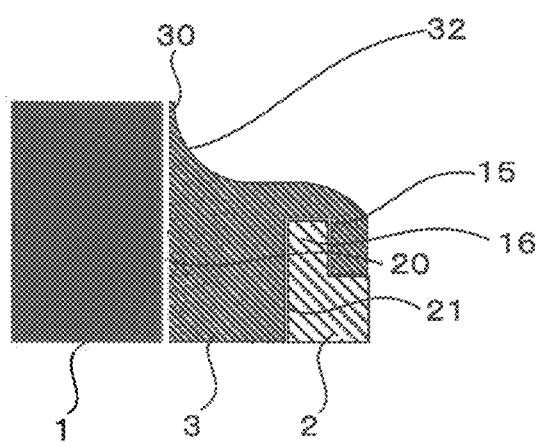
FIG. 15 is an enlarged cross-sectional view showing a modification of the ultrasonic sensor according to the third embodiment of the invention.
Figure 16:
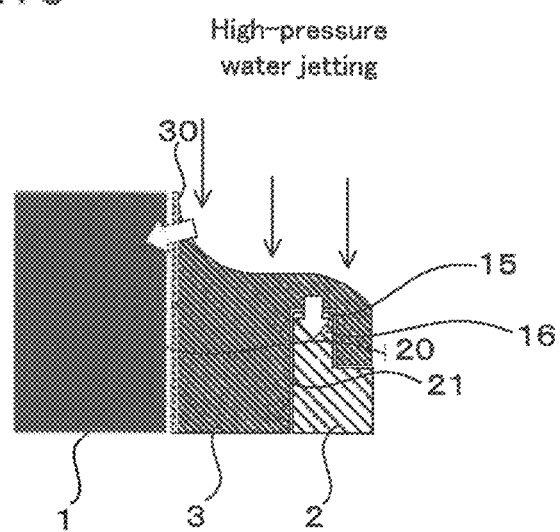
FIG. 16 is an enlarged cross-sectional view showing a state in which high-pressure water is jetted in FIG. 15.

FIG. 15 is an enlarged cross-sectional view showing a modification of the ultrasonic sensor according to the third embodiment of the invention. FIG. 16 is an enlarged cross-sectional view showing a state in which high-pressure water is jetted in FIG. 15. When a water-infiltration passage formed of the gap 21 is further bent by the fitting between a concave portion 15 of the elastic member 3 and a convex portion 16 of the sensor case 2 as shown in FIGS. 15 and 16 in addition to the structure of the third embodiment, the infiltration of water can be inhibited and positional accuracy and locking between the elastic member 3 and the sensor case 2 can be enhanced.

Meanwhile, even in the ultrasonic sensor 22 according to the third embodiment, an opening face of the sensor case 2 and an outer peripheral portion of the elastic member 3 facing the sensor case 2 recede from the vibration surface 14 of the ultrasonic transducer 1. That is, since the vibration surface 14 of the ultrasonic sensor 22 according to the third embodiment protrudes from the opening face of the sensor case 2 and an outer peripheral surface of the elastic member 3 facing the sensor case 2, the vibration surface 14 of the ultrasonic transducer 1, the outer peripheral portion of the elastic member 3, and the opening face of the sensor case 2 are not flush with one another.

Since the outer peripheral portion of the ultrasonic sensor 22 recedes, high-pressure water to be jetted escapes to the outside when the high-pressure water is jetted. Accordingly, the concentration of water on the gap can be further prevented.

Fourth Embodiment

Figure 17:
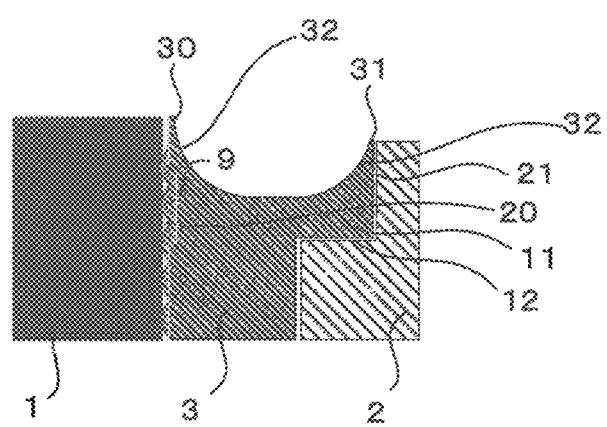
FIG. 17 is an enlarged cross-sectional view of an opening face of an ultrasonic sensor according to a fourth embodiment of the invention.
Figure 18:
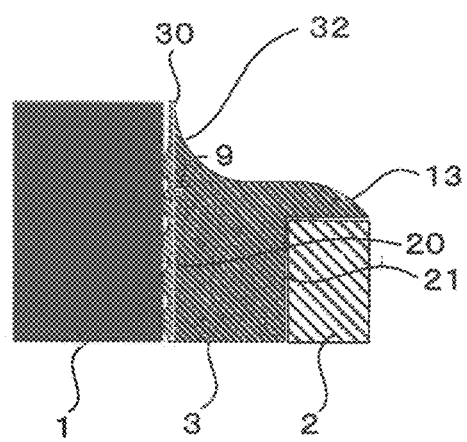
FIG. 18 is an enlarged cross-sectional view showing a modification of the ultrasonic sensor according to the fourth embodiment of the invention.

FIG. 17 is an enlarged cross-sectional view of an opening face of an ultrasonic sensor according to a fourth embodiment of the invention. FIG. 18 is an enlarged cross-sectional view showing a modification of the ultrasonic sensor according to the fourth embodiment of the invention. In the fourth embodiment, the same reference numerals as the reference numerals of the first to third embodiments denote the same components as the components of the first to third embodiments. Accordingly, the description of the same components will be omitted. As shown in FIG. 17, in an ultrasonic sensor 22 according to the fourth embodiment of the invention, a plurality of annular protrusions 9 are formed on the inner peripheral surface of an elastic member 3, which faces an ultrasonic transducer 1, in addition to the structural characteristics of the modification of the second embodiment.

Since the ultrasonic transducer 1 and the elastic member 3 come into line contact with each other through the annular protrusions 9, the ultrasonic transducer 1 and the elastic member 3 come into slight contact with each other with a small area.

Accordingly, it is possible to obtain the ultrasonic sensor 22 that can prevent a breakdown caused by the jet of high-pressure wash water without the deterioration of the sensitivity of the ultrasonic transducer 1 within the range of the fixing-clamping caused by the elastic member 3.

Further, as shown in FIG. 18, in the modification of the ultrasonic sensor 22 according to the fourth embodiment of the invention, a plurality of annular protrusions 9 are formed on the inner peripheral surface of the elastic member 3, which faces the ultrasonic transducer 1, in addition to the structural characteristics of the third embodiment. Even in the modification shown in FIG. 18, the ultrasonic transducer 1 and the elastic member 3 come into line contact with each other through the annular protrusions 9. Accordingly, the ultrasonic transducer 1 and the elastic member 3 come into slight contact with each other with a small area. Meanwhile, a structure in which the plurality of annular protrusions 9 are formed on the inner peripheral surface of the above-mentioned elastic member 3 facing the ultrasonic transducer 1 can be applied to all of the first to third embodiments and the same effects can be obtained.

Fifth Embodiment

Figure 19:
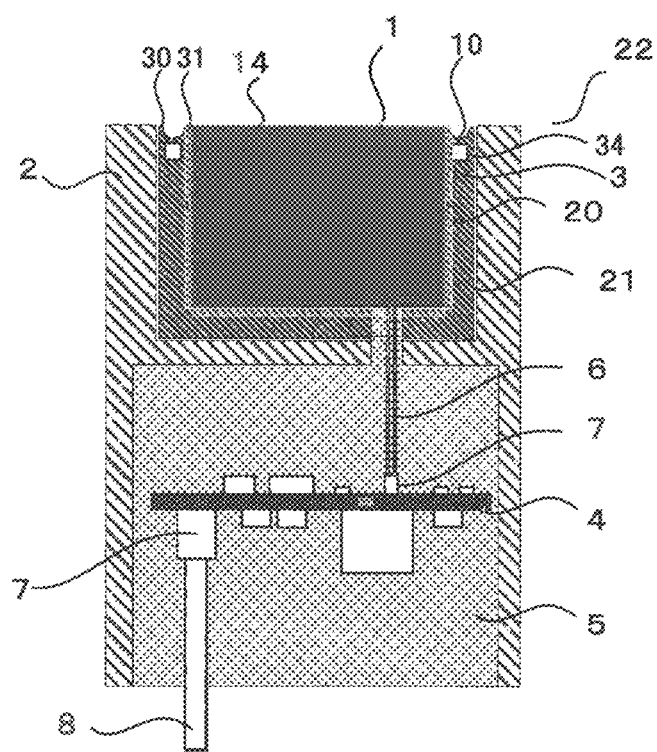
FIG. 19 is a cross-sectional view of an ultrasonic sensor according to a fifth embodiment of the invention.
Figure 20:
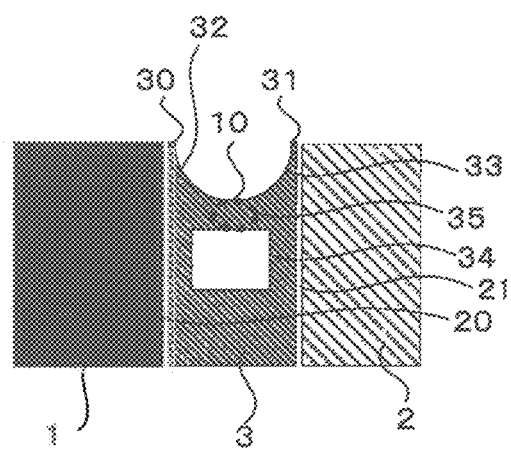
FIG. 20 is an enlarged cross-sectional view of an opening face of the ultrasonic sensor according to the fifth embodiment of the invention.
Figure 21:
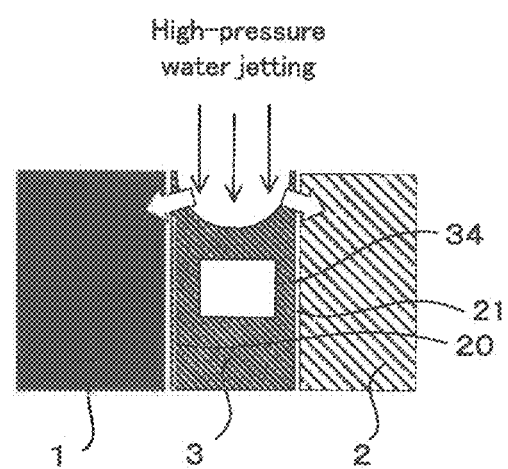
FIG. 21 is an enlarged cross-sectional view showing a state in which high-pressure water is jetted in FIG. 20.
Figure 22:
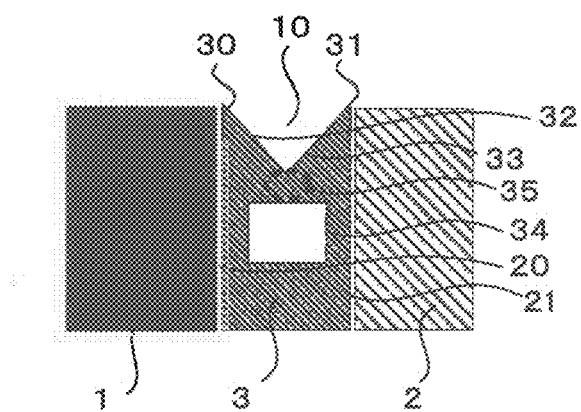
FIG. 22 is an enlarged cross-sectional view showing a modification of the ultrasonic sensor according to the fifth embodiment of the invention.

FIG. 19 is a cross-sectional view of an ultrasonic sensor according to a fifth embodiment of the invention. FIG. 20 is an enlarged cross-sectional view of an opening face of the ultrasonic sensor according to the fifth embodiment of the invention. FIG. 21 is an enlarged cross-sectional view showing a state in which high-pressure water is jetted in FIG. 20, and FIG. 22 is an enlarged cross-sectional view showing a modification of the ultrasonic sensor according to the fifth embodiment of the invention. In the fifth embodiment, the same reference numerals as the reference numerals of the first embodiment denote the same components as the components of the first embodiment. Accordingly, the description of the same components will be omitted.

As shown in FIGS. 19 to 22, in the fifth embodiment, an annular stiff member 34 is embedded in the middle portion of an elastic member 3 in a thickness direction below a supporting point 35 of thin portions 30 and 31 acting as valves in addition to the structure of the first embodiment. The stiff member 34 is an object having high stiffness, and is, for example, a metal ring or the like. Since the stiff member 34 is provided below the supporting point 35, it is possible to reduce the possibility that the supporting point 35 of the thin portions 30 and 31 acting as valves may be buckled even though high-pressure wash water directly hits the supporting point 35. Accordingly, it is possible to prevent the infiltration of water against the design intention of the valves and to prevent the ultrasonic transducer 1 from moving to the outside of the ultrasonic sensor 22.

Figure 23:
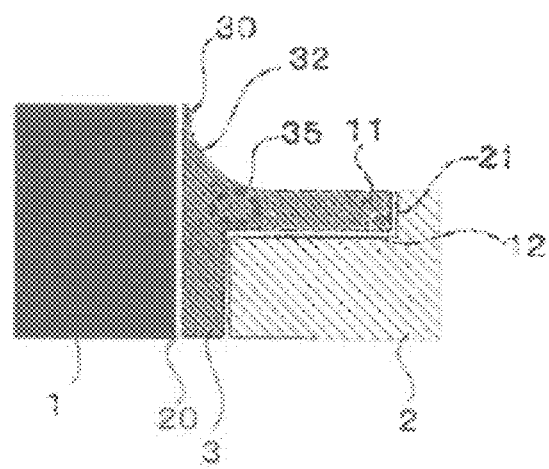
FIG. 23 is an enlarged cross-sectional view of an opening face of another modification of the ultrasonic sensor according to the fifth embodiment of the invention.

FIG. 23 is an enlarged cross-sectional view of an opening face of another modification of the ultrasonic sensor according to the fifth embodiment of the invention. In FIG. 23, the same reference numerals as the reference numerals of the second embodiment denote the same components as the components of the second embodiment. Accordingly, the description of the same components will be omitted. As shown in FIG. 23, in another modification of the fifth embodiment, an annular stepped portion 12 of the sensor case 2 extends to a lower portion of the supporting point 35 of the thin portion 30. Since the lower portion of the supporting point 35 is supported by the sensor case 2, it is possible to reduce the possibility that the supporting point 35 of the thin portion 30 acting as a valve may be buckled even when high-pressure wash water directly hits the supporting point 35. Accordingly, it is possible to prevent the infiltration of water against the design intention of the valve and to prevent the ultrasonic transducer 1 from moving to the outside of the ultrasonic sensor 22.

Figure 24:
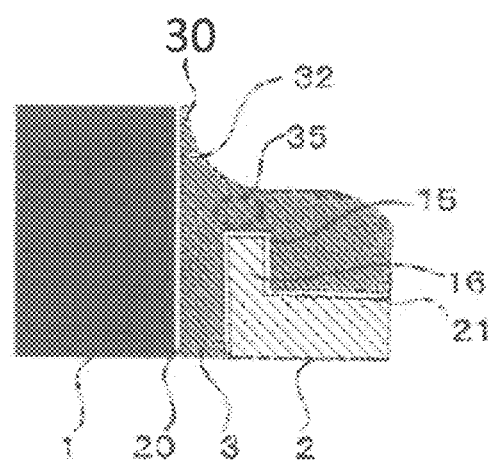
FIG. 24 is an enlarged cross-sectional view of an opening face of another modification of the ultrasonic sensor according to the fifth embodiment of the invention.

FIG. 24 is an enlarged cross-sectional view of an opening face of another modification of the ultrasonic sensor according to the fifth embodiment of the invention. In FIG. 24, the same reference numerals as the reference numerals of the third embodiment denote the same components as the components of the third embodiment. Accordingly, the description of the same components will be omitted. As shown in FIG. 24, a convex portion 16 of the sensor case 2 extends to a lower portion of the supporting point 35 of the thin portion 30 in FIG. 24. Since the lower portion of the supporting point 35 is supported by the convex portion 16 of the sensor case 2, it is possible to reduce the possibility that the supporting point 35 of the thin portion 30 acting as a valve may be buckled even when high-pressure wash water directly hits the supporting point 35. Accordingly, it is possible to prevent the infiltration of water against the design intention of the valve and to prevent the ultrasonic transducer 1 from moving to the outside of the ultrasonic sensor 22.

Sixth Embodiment

Figure 25:
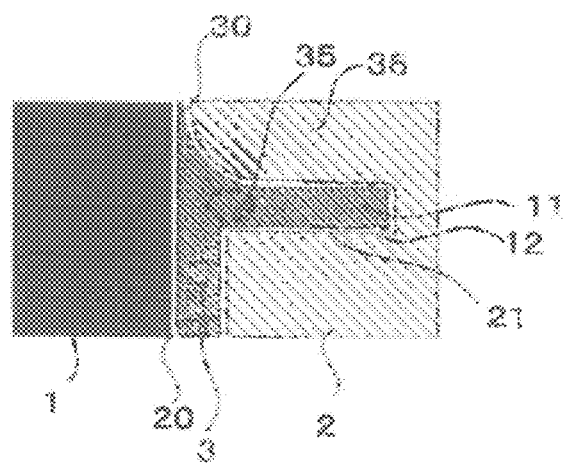
FIG. 25 is an enlarged cross-sectional view of an opening face of an ultrasonic sensor according to a sixth embodiment of the invention.

FIG. 25 is an enlarged cross-sectional view of an opening face of an ultrasonic sensor according to a sixth embodiment of the invention. In the sixth embodiment, the same reference numerals as the reference numerals of the second and fifth embodiments denote the same components as the components of the second and fifth embodiments. Accordingly, the description of the same components will be omitted. In the sixth embodiment, a stiff member 36 is provided above a supporting point 35 of a thin portion 30 acting as a valve. Accordingly, even though high-pressure wash water directly hits the supporting point 35, it is possible to reduce the possibility that the supporting point 35 of the thin portion 30 acting as a valve may be buckled. In the sixth embodiment, apart of the sensor case 2 may extend so as to cover an exposed surface end of an elastic member 3 close to an opening face, and the exposed surface end of the elastic member 3 close to the opening face may be covered with a stiff member 36 that is separate from a sensor case 2. The stiff member 36 is an object having high stiffness, and may be, for example, metal or a resin molding material.

Further, when a water-infiltration passage formed of a gap 21 is further bent by the fitting between an annular protrusion 11 of the elastic member 3 and an annular stepped portion 12 of the sensor case 2, the infiltration of water can be inhibited and positional accuracy and locking between the elastic member 3 and the sensor case 2 can be enhanced. Furthermore, since the movable range of the thin portion 30, particularly, a movement in an opening direction can be suppressed in the sixth embodiment, it is possible to prevent the infiltration of high-pressure wash water. Moreover, it is also possible to prevent the elastic member 3 from moving.

Meanwhile, the respective embodiments of the invention may be freely combined with each other or each of the embodiments may be appropriately modified or omitted within the scope of the invention.

Various modifications and alterations of this invention will be apparent to those skilled in the art without departing from the scope and sprit of this invention, and it should be understood that this is not limited to the illustrative embodiments set forth herein.

What is claimed is:

1. An ultrasonic sensor comprising:
   a cylindrical sensor case;
   an ultrasonic transducer that is disposed close to an opening face in the sensor case and includes a vibration surface; and
   an elastic member that is provided between the ultrasonic transducer and the sensor case and covers a side surface and a bottom of the ultrasonic transducer, said elastic member having an inner peripheral portion having an inner peripheral side wall facing said ultrasonic transducer and an outer peripheral portion having an outer peripheral side wall facing said sensor case,
   wherein the elastic member includes an exposed surface end close to the opening face, said exposed end surface having an inclined surface portion that is at least one of curved or concave and that slopes downward toward a middle of the elastic member in a thickness direction, whereby at least one of said peripheral walls is thinner near said exposed end surface than at another portion of the elastic member that covers the side surface of the ultrasonic transducer.

2. The ultrasonic sensor according to claim 1, wherein the inclined surface includes a curved surface.

3. The ultrasonic sensor according to claim 1, wherein the inner peripheral portion of the elastic member, which faces the ultrasonic transducer, is formed to be thin.

4. The ultrasonic sensor according to claim 1, wherein said inclined surface is provided by a concave portion provided at the exposed surface end of the elastic member.

5. The ultrasonic sensor according to claim 1,
   wherein the elastic member includes a protrusion at said outer peripheral portion of the elastic member that faces the sensor case, and
   the sensor case includes a stepped portion that is fitted to the protrusion.

6. The ultrasonic sensor according to claim 1,
   wherein the elastic member includes a protrusion at said outer peripheral portion of the elastic member that faces the sensor case, and
   the opening face of the sensor case is covered with the protrusion.

7. The ultrasonic sensor according to claim 1, wherein the elastic member is provided with a plurality of annular protrusions that are provided on said inner peripheral side wall of the elastic member facing the ultrasonic transducer.

8. The ultrasonic sensor according to claim 1, wherein the opening face of the sensor case and the outer peripheral portion of the elastic member facing the sensor case recede from the vibration surface of the ultrasonic transducer.

9. The ultrasonic sensor according to claim 1, wherein a stiff member is embedded in a middle portion of the elastic member in the thickness direction.

10. The ultrasonic sensor according to claim 5, wherein the stepped portion of the sensor case extends toward a position below a thin portion where the inner peripheral portion of the elastic member is formed to be thin.

11. The ultrasonic sensor according to claim 1, wherein a concave portion is provided at the elastic member and is fitted to a convex portion provided at the sensor case, and
    the convex portion extends toward a position below a thin portion where the inner peripheral portion of the elastic member is formed to be thin.

12. The ultrasonic sensor according to claim 9, wherein the exposed surface end of the elastic member close to the opening face is covered with a second stiff member.

13. The ultrasonic sensor according to claim 12, wherein the second stiff member is a part of the sensor case.

14. An ultrasonic sensor comprising:
    a cylindrical sensor case;
    an ultrasonic transducer that is disposed close to an opening face in the sensor case and includes a vibration surface; and
    an elastic member that is provided between the ultrasonic transducer and the sensor case and covers a side surface and a bottom of the ultrasonic transducer, said elastic member having an inner peripheral portion having an inner peripheral side wall facing said ultrasonic transducer and an outer peripheral portion having an outer peripheral side wall facing said sensor case,
    wherein the elastic member includes an exposed surface end close to the opening face, said exposed end surface having an inclined surface portion that slopes downward toward a middle of the elastic member in a thickness direction, whereby at least one of said peripheral walls at a location between said transducer and sensor case is thinner near said exposed end surface than at another portion of the elastic member that covers the side surface of the ultrasonic transducer.

* * * * *